(12) United States Patent  
Inkyo et al.

(10) Patent No.: US 10,890,515 B2  
(45) Date of Patent: Jan. 12, 2021

(54) CLASSIFYING APPARATUS

(71) Applicants: SATAKE CHEMICAL EQUIPMENT MFG LTD., Toda (JP); Mitsugi Inkyo, Kure (JP)

(72) Inventors: Mitsugi Inkyo, Kure (JP); Makoto Sato, Toda (JP); Masaaki Ogihara, Toda (JP)

(73) Assignees: SATAKE CHEMICAL EQUIPMENT MFG. LTD., Toda (JP); Mitsugi Inkyo, Kure (JP)

( * ) Notice: Subject to any disclaimer, the term of this patent is extended or adjusted under 35 U.S.C. 154(b) by 100 days.

(21) Appl. No.: 16/242,044

(22) Filed: Jan. 8, 2019

(65) Prior Publication Data

US 2019/0226966 A1 Jul. 25, 2019

Related U.S. Application Data

(63) Continuation of application No. PCT/JP2017/028824, filed on Aug. 8, 2017.

(30) Foreign Application Priority Data

Aug. 9, 2016 (JP) ................................ 2016-156438

(51) Int. Cl.  
*G01N 15/02* (2006.01)  
*B03B 5/28* (2006.01)  
*B07B 7/08* (2006.01)  
*B02C 17/00* (2006.01)  
*B03B 5/34* (2006.01)  
*B03B 7/00* (2006.01)

(52) U.S. Cl.  
CPC ....... *G01N 15/0266* (2013.01); *B02C 17/002* (2013.01); *B03B 5/28* (2013.01); *B03B 5/34* (2013.01); *B03B 7/00* (2013.01); *B07B 7/08* (2013.01)

(58) Field of Classification Search  
None  
See application file for complete search history.

(56) References Cited

FOREIGN PATENT DOCUMENTS

| JP | 53-073668 A | 6/1978 |
|---|---|---|
| JP | 62-201679 A | 9/1987 |
| JP | 06-190343 A | 7/1994 |
| JP | 10-277490 A | 10/1998 |
| JP | 2000-512550 A | 9/2000 |
| JP | 2002-143707 A | 5/2002 |

(Continued)

OTHER PUBLICATIONS

English language International Search Report from corresponding PCT/JP2017/028824 (2 pgs).

*Primary Examiner* — Stephen D Meier  
*Assistant Examiner* — Nigel H Plumb  
(74) *Attorney, Agent, or Firm* — Flynn Thiel, P.C.

(57) ABSTRACT

An apparatus for classifying fine particles in slurry provides a sharp particle size distribution with few mixed coarse particles and high classification accuracy.

The apparatus includes a rotor (15) including classification chambers (17) between blades (16) radially arranged at circumferentially regular intervals, and classifies particles so that a classified particle size is constant in an entire radial region from an outer periphery to an inner periphery of the classification chamber. The blade (16) of the rotor has a circumferential thickness t(d) increasing toward the outer periphery, and the classification chamber (17) has a width increasing toward the inner periphery.

4 Claims, 14 Drawing Sheets

(56) References Cited

FOREIGN PATENT DOCUMENTS

| JP | 2002-515819 | A | 5/2002 |
| JP | 2010-253394 | A | 11/2010 |
| JP | 2011-072993 | A | 4/2011 |
| JP | 6032864 | B2 | 4/2011 |

CLASSIFYING APPARATUS

CROSS-REFERENCE TO RELATED APPLICATIONS

This application is a continuation application of PCT/JP2017/028824, filed Aug. 8, 2017, which claims priority to Japanese Application No. 2016-156438, filed Aug. 9, 2016, the entire contents all of which are incorporated hereby by reference.

TECHNICAL FIELD

The present invention relates to an apparatus for classifying fine particles in gas or slurry.

BACKGROUND ART

Classifying apparatuses include a rotor 2 having blades 1 radially or eccentrically provided from a rotation center at circumferentially regular intervals as shown in FIG. 1 and rotate the rotor 2 at high speed to classify fine particles in air for a dry type classifying apparatus and classify fine particles in slurry for a wet type classifying apparatus.

FIG. 2 shows an outline configuration of a general classification system including a dry type classifying apparatus 3 that includes the rotor 2 therein. A raw material supply device 5 supplies a raw material together with air to the classifying apparatus 3, and the rotor 2 that rotates at high speed classifies the raw material into coarse particles and fine particles. The coarse particles are discharged from the classifying apparatus 3 and collected in a container 6, while the fine particles flow through a flow-out chamber 8 around a drive shaft 7 connected to the rotor 2 into a bag filter 11, in which the fine particles are separated from air and collected in a container 12. An example of such a dry type classifying apparatus is disclosed in Patent Literature 2 mentioned below.

FIG. 3 shows an outline configuration of a general classification system including a wet type classifying apparatus 14. A slurry tank 15 supplies a raw material slurry to the classifying apparatus 14 using a slurry pump 16, and a rotor 17 that rotates at high speed classifies the raw material slurry into slurry containing coarse particles and slurry containing fine particles. The coarse particle slurry is discharged out of the classifying apparatus 14, while the fine particle slurry flows through a hollow drive shaft 18 connected to the rotor 17 and is collected in a tank 19. An example of such a wet type classifying apparatus is disclosed in Patent Literature 1 mentioned below.

In the rotor 2 in FIG. 1, while the gas or slurry (hereinafter referred to as a fluid) flows into the rotor 2 and moves toward an inner peripheral side, the particles in the fluid are subjected to a centrifugal force due to a high speed rotation of the rotor 2 and a drag due to the fluid flowing toward an inner periphery opposite to a direction of action of the centrifugal force, and classified into coarse particles and fine particles. The coarse particle has a size larger than a particle size at which the centrifugal force and the drag are balanced, and the fine particle has a size smaller than that. This will be described with reference to a particle 10 flowing into any classification chamber 9 between the blades 1 of the rotor 2 that rotates at high speed illustrated in FIG. 1.

In a diameter d position of the classification chamber 9, the particle 10 is subjected to opposite actions of a centrifugal force F acting radially outward and a drag R acting opposite to the centrifugal force F due to a fluid flowing toward an inner peripheral side. The centrifugal force F is expressed by Expression 1 below:

$$F = \frac{1}{6}\pi D^3 \cdot g(\rho_2 - \rho_1) \cdot 0.001118n^2 \cdot (d/2) = \frac{1}{6}\pi D^3 \cdot 9.8(\rho_2 - \rho_1) \cdot \frac{d \cdot n^2}{2 \times 894}$$

Expression 1 where D is a diameter when the particle 10 is assumed to be a sphere, n is a rotation speed of the rotor 2, $\rho_1$ is specific gravity of the fluid, $\rho_2$ is specific gravity of the particle 10, and g is acceleration of gravity.

The drag R is expressed from Stokes' theorem by Expression 2 below:

$$R = 3\pi D \cdot \eta \cdot s$$

Expression 2 where $\eta$ is viscosity of the fluid, and s is a linear speed of the fluid flowing inward.

The linear speed s is expressed by Expression 3 below:

$$s = \frac{Q}{A \cdot N}$$

Expression 3 where A is an arc area on a circumference in the diameter d position of the classification chamber 9 in FIG. 1 (hereinafter simply referred to as an arc area), N is the number of classification chambers 9 in a peripheral direction, and Q is a flow rate of the fluid flowing toward the inner periphery.

The arc area A in Expression 3 is obtained by multiplying a length of an arc on the circumference in the diameter d position by a length of the rotor along a rotation axis (height). Since multiple classification chambers are provided and N is much larger than 1, the arc and a chord length of the arc are small, and the arc area A approximates to the chord length multiplied by the length of the rotor along the rotation axis (height), which is a sectional area of the chord. Thus, these areas are herein treated substantially equally. Similarly, a circumferential thickness of the blade (hereinafter simply referred to as a blade thickness) in the diameter d position and a chord, as well as a gap as a circumferential arc length between the blades (hereinafter simply referred to as a gap between the blades) in the diameter d position and a chord are herein treated substantially equally since the lengths of the arc and the chord approximate.

In the diameter d position of the classification chamber 9, a classified particle size $D_1$ of the particle 10 at which the centrifugal force F=the drag R is expressed from Expressions 1 to 3 above by Expression 4 below:

$$D_1 = \sqrt{\frac{Q}{N} \cdot \frac{1}{A} \cdot \frac{2 \times 894}{d \cdot n^2} \cdot \frac{18\eta}{9.8(\rho_2 - \rho_1)}}$$

Expression 4

In the diameter d position of the classification chamber 9, particles are classified with reference to the classified particle size $D_1$ at which the centrifugal force F and the drag R are balanced. Particles with R>F have a particle size smaller than the classified particle size $D_1$ and move toward an inner peripheral side, while particles with R<F have a particles size larger than the classified particle size $D_1$ and move radially outward.

CITATION LIST

Patent Literature

Patent Literature 1 Japanese Patent Laid-Open No. 2002-143707
Patent Literature 2 Japanese Patent Laid-Open No. 2011-72993

SUMMARY OF INVENTION

Technical Problem

In the conventional apparatus disclosed in Patent Literature 1, as expressed by Expression 4, the classified particle size $D_1$ is a function of a linear speed $s=Q/(A\cdot N)$ expressed by Expression 3, a centrifugal effect G expressed by $G=(d\cdot n^2)/(2\times 894)$, and a diameter d, and increases with increasing linear speed s and decreasing centrifugal effect G and diameter d. In the conventional apparatus, a blade of the rotor has a radially constant height and thickness. Thus, an arc area decreases toward an inner periphery, and the linear speed s increases from Expression 3. The centrifugal effect G decreases with decreasing diameter d.

In the classifier disclosed in Patent Literature 2, under the condition of a constant blade thickness and arc area in a diametrical direction of a classification chamber, a blade height increases toward an inner periphery for a constant linear speed, but the increase in blade height is not enough to compensate for a reduction in centrifugal effect G due to a reduction in diameter d. Even if a linear speed s expressed by $Q/(A\cdot N)$ in Expression 4 is constant, the classified particle size $D_1$ inevitably increases due to the diameter d. In short, the classifier disclosed in Patent Literature 2 somewhat reduces a rate of increase of the classified particle size as compared to a conventional apparatus, but does not prevent the increase in classified particle size.

As described above, in both the classifiers, the classified particle size $D_1$ increases toward the inner periphery. A fluid outside the rotor that rotates at high speed is in a turbulence state, and if a coarse particle, having a size larger than the classified particle size $D_1$ and having a small difference in size from the classified particle size $D_1$, enters, the coarse particle may be mixed in the inner peripheral side to reach the inner periphery and easily collected as it is.

The classified particle size $D_1$ is obtained by Expression 4 as described above, but may be expressed as below.

The arc area A in the diameter d position is expressed by:

$$A = E \cdot T = \frac{(\pi d - tN)T}{N} \qquad \text{Expression 5}$$

where T is a height of the blade 1 in a direction perpendicular to the plane of FIG. 1, that is, a height along a rotation axis of the rotor 2, E is a gap between the blades, and t is a thickness of the blade 1, and from Expressions 5 and 4, the classified particle size $D_1$ is expressed by:

$$D_1 = \sqrt{\frac{Q}{(\pi d - tN)T} \cdot \frac{2\times 894}{d\cdot n^2} \cdot \frac{18\eta}{9.8(\rho_2 - \rho_1)}} \qquad \text{Expression 6}$$

With a flow rate Q, the number N of classification chambers, a height T of the blade 1, a thickness t of the blade 1, and a rotation speed n of the rotor 2 being set values, and viscosity $\eta$ and specific gravity $\rho_1$ of the fluid and specific gravity $\rho_2$ of the particle 10 being constant, the classified particle size $D_1$ is a function of the diameter d. As seen from Expression 6, with increasing diameter d of the classification chamber 9, the classified particle size $D_1$ decreases, while with decreasing diameter d, the classified particle size $D_1$ increases.

Next, a simulation calculation was performed to find how the classified particle size $D_1$ specifically changes in a radial direction of the rotor 2 with set values in Table 1 below. Results are shown in Table 2 below together with a centrifugal effect G, the arc area A, a gap E between the blades, and a linear speed s as a moving speed of the fluid flowing toward an inner peripheral side of the rotor.

TABLE 1

| SET VALUE | | | | | | | | |
|---|---|---|---|---|---|---|---|---|
| DIAMETER POSITION d m | FLOW RATE Q m³/s | BLADE HEIGHT T m | BLADE THICKNESS t m | NUMBER OF CLASSIFICATION CHAMBERS N — | ROTATION SPEED OF ROTOR n rpm | VISCOSITY $\eta$ kg/m·s | SPECIFIC GRAVITY OF PARTICLE $\rho_2$ kg/m³ | SPECIFIC GRAVITY OF FLUID $\rho_1$ kg/m³ |
| 0.40 | 0.00001 | 0.01 | 0.005 | 12 | 2500 | 0.001 | 2300 | 1000 |
| 0.35 | 0.00001 | 0.01 | 0.005 | 12 | 2500 | 0.001 | 2300 | 1000 |
| 0.30 | 0.00001 | 0.01 | 0.005 | 12 | 2500 | 0.001 | 2300 | 1000 |
| 0.25 | 0.00001 | 0.01 | 0.005 | 12 | 2500 | 0.001 | 2300 | 1000 |
| 0.20 | 0.00001 | 0.01 | 0.005 | 12 | 2500 | 0.001 | 2300 | 1000 |

TABLE 2

| CALCULATED VALUE | | | | | |
|---|---|---|---|---|---|
| DIAMETER POSITION d m | CLASSIFIED PARTICLE SIZE $D_1$ μm | CENTRIFUGAL EFFECT G — | ARC AREA A m² | GAP BETWEEN BLADES E m | LINEAR SPEED s m/s |
| 0.40 | 0.92 | 1398 | 0.00100 | 0.100 | 0.00084 |
| 0.35 | 1.05 | 1223 | 0.00087 | 0.087 | 0.00096 |

TABLE 2-continued

| | | CALCULATED VALUE | | | |
|---|---|---|---|---|---|
| DIAMETER POSITION d m | CLASSIFIED PARTICLE SIZE $D_1$ μm | CENTRIFUGAL EFFECT G — | ARC AREA A $m^2$ | GAP BETWEEN BLADES E m | LINEAR SPEED s m/s |
| 0.30 | 1.24 | 1049 | 0.00074 | 0.074 | 0.00113 |
| 0.25 | 1.49 | 874 | 0.00060 | 0.060 | 0.00138 |
| 0.20 | 1.89 | 699 | 0.00047 | 0.047 | 0.00176 |

Patent Literature 2 discloses a method for performing classification using a rotor with a constant arc area A obtained by reducing a radius and increasing a blade height and with a constant linear speed s.

For a classified particle size $D_1$ by this method, a simulation calculation was performed using Expressions 5 and 6 above to obtain a blade height T and the classified particle size $D_1$, with a rotation speed n of the rotor, viscosity η, a flow rate Q, specific gravity $\rho_1$ of a fluid, specific gravity $\rho_2$ of a particle, a thickness t of the blade, and the number N of classification chambers being the same set values as in Table 1, a linear speed s being set to 0.00084 m/sec in the diameter position of 0.40 m and on an outer periphery of the classification chamber in Table 2. A gap E between the blades is (πd−tN)/N from Expression 5. The results are shown in Table 3 below.

TABLE 3

| | | CALCULATED VALUE | | | | |
|---|---|---|---|---|---|---|
| DIAMETER POSITION d m | FLOW RATE Q $Nm^3/s$ | ARC AREA A $m^2$ | GAP BETWEEN BLADES E m | BLADE HEIGHT T m | LINEAR SPEED s m/sec | CLASSIFIED PARTICLE SIZE $D_1$ μm |
| 0.40 | 0.00001 | 0.00100 | 0.100 | 0.0100 | 0.00084 | 0.92 |
| 0.35 | 0.00001 | 0.00100 | 0.087 | 0.0115 | 0.00084 | 0.98 |
| 0.30 | 0.00001 | 0.00100 | 0.074 | 0.0135 | 0.00084 | 1.06 |
| 0.25 | 0.00001 | 0.00100 | 0.060 | 0.0167 | 0.00084 | 1.16 |
| 0.20 | 0.00001 | 0.00100 | 0.047 | 0.0213 | 0.00084 | 1.30 |

In Table 3, the blade height T at the gap E between the blades obtained in the diameter d position was obtained by substituting the constant arc area A in Table 3 and the gap E between the blades in Table 3 into Expression 5. The linear speed s was obtained by Expression 3 above, and the classified particle size $D_1$ was obtained by a simulation calculation by substituting appropriate items in Table 1 into Expression 6 above.

In the conventional apparatus in Patent Literature 1, both the classified particle size $D_1$ and the linear speed s increase toward the inner periphery as shown in Table 2. In the classifier in Patent Literature 2, even at the constant linear speed s, the centrifugal effect G expressed by $(d \cdot n^2)/(2 \times 894)$ decreases toward the inner periphery. Thus, the classified particle size $D_1$ still increases as in Table 3 with a reduced rate of increase.

The present invention has an object to provide a classifying apparatus capable of obtaining a sharp particle size distribution with few mixed coarse particles and high classification accuracy as compared to the conventional classifying apparatuses described above.

Solution to Problem

The present invention provides an apparatus, in which a rotor that includes multiple blades radially or eccentrically arranged at circumferentially appropriate intervals and classification chambers between the blades is provided to move particles having a size larger than a classified particle size toward an outer peripheral side and move particles having a size smaller than the classified particle size toward an inner peripheral side while a fluid flowing into the classification chambers flows from the outer peripheral side to the inner peripheral side, and to classify fine particles in the fluid, in which the particles are classified so that the classified particle size is constant in an entire radial region from an outer periphery to an inner periphery of the classification chamber.

A method for providing a constant classified particle size in a radial direction is intended to increase an arc area A toward an inner periphery to satisfy the need of the present invention to reduce a linear speed s toward the inner periphery to complement for a centrifugal effect decreasing toward the inner periphery. The method includes three modes described below.

A first mode is providing a constant blade thickness in a diametrical direction to increase a blade height toward the inner periphery as compared to Patent Literature 2. A second mode is providing a constant blade height to decrease a blade thickness toward the inner periphery as in the conventional apparatus disclosed in Patent Literature 1. A third mode is a combination of the first and second modes, that is, increasing the blade height and decreasing the blade thickness toward the inner periphery.

Advantageous Effect of Invention

According to the present invention, the classified particle size is set to be constant in the entire radial region from the outer periphery to the inner periphery of the classification chamber. Thus, the fine particles having a size equal to or smaller than the classified particle size are classified in the entire region from the outer periphery to the inner periphery and moved toward the inner peripheral side. Even if coarse particles having a size larger than the classified particle size enter, classification is performed across the entire region of the classification chamber, and thus the coarse particles are more likely to be expelled toward the outer peripheral side. This prevents mixture of the coarse particles, thus prevents the coarse particles from mixing into collected products, and can provide a product with a sharp particle size distribution and high classification performance.

DESCRIPTION OF EMBODIMENT

A classifying apparatus of this embodiment is an apparatus using a rotor that includes blades radially or eccentrically provided from a rotation center at circumferentially regular intervals and classification chambers between the blades to rotate the rotor at high speed and to classify fine particles in a fluid flowing into the rotor, in which any of the first to third modes described above is used to classify the particles so that a classified particle size is constant in an entire radial region from an outer periphery to an inner periphery of the classification chamber. Structures of classifying apparatuses used in the modes will be described below.

Figure 1:
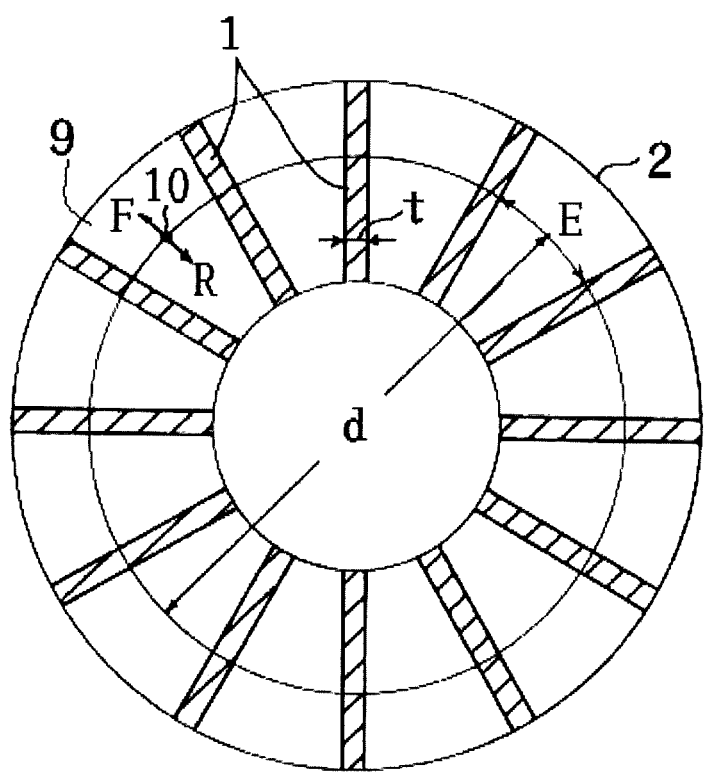
FIG. 1 is a cross sectional view of a rotor that constitutes a classifying apparatus.
Figure 4:
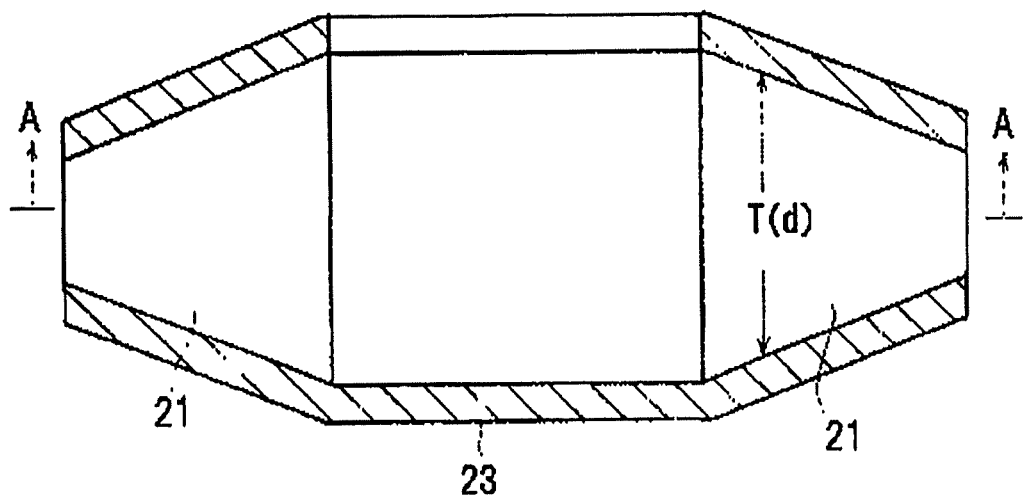
FIG. 4 is a vertical sectional view of a rotor according to an embodiment of the present invention.
Figure 5:
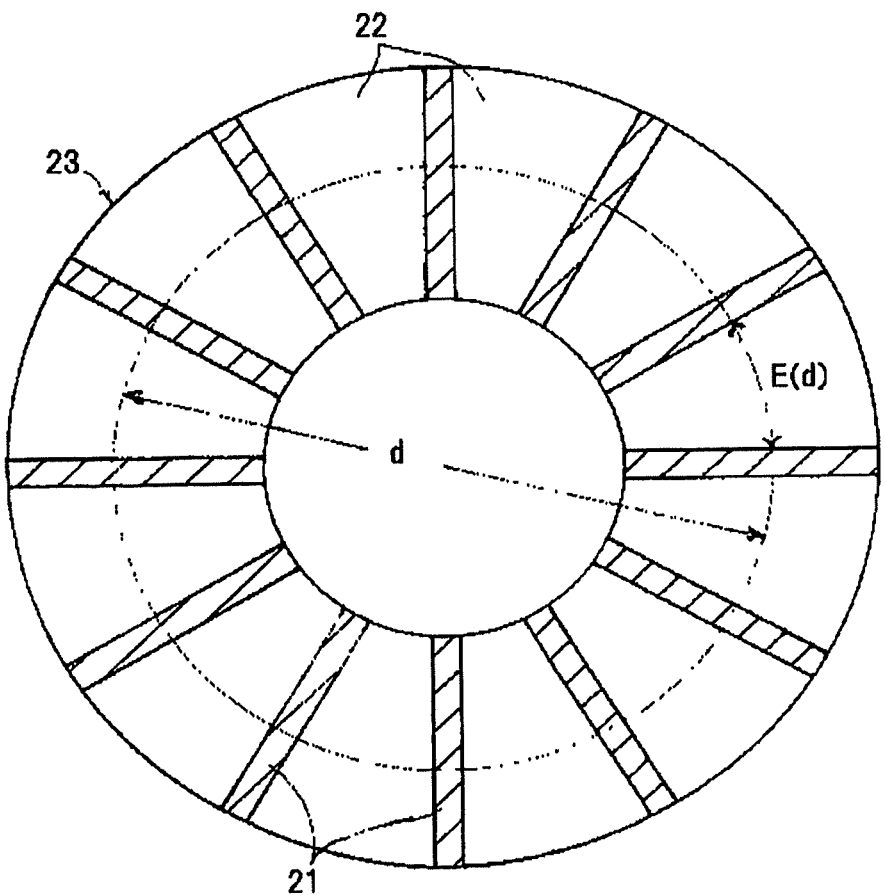
FIG. 5 is a sectional view taken along the line A-A in the rotor in FIG. 4.

FIGS. 4 and 5 show a rotor of a classifying apparatus used in the first mode. FIG. 4 is a vertical sectional view of a rotor 23, and FIG. 5 is a sectional view taken along the line A-A in FIG. 4. The rotor 23 in FIG. 5 has the same cross section as the rotor 2 in FIG. 1 but a different vertical section.

A classified particle size $D_1$ in the rotor 23 is obtained in the same manner as described above. Specifically, in a diameter d position of the rotor 23 in FIG. 5, the classified particle size $D_1$ at which a centrifugal force F and a drag R are balanced is expressed from Expression 6 above by:

$$D_1 = \sqrt{\frac{Q}{(\pi d - tN)T(d)} \cdot \frac{2 \times 894}{d \cdot n^2} \cdot \frac{18\eta}{9.8(\rho_2 - \rho_1)}} \quad \text{Expression 7}$$

where $T(d)$ is a height of a blade 21 in a direction perpendicular to the plane of FIG. 5 as a function of a diameter d. As described above, in the diameter d position, particles having a size larger than the classified particle size $D_1$ are expelled radially outward, while particles having a size smaller than the classified particle size $D_1$ move radially inward. In Expression 7, Q, N, t, A, n, $\eta$, $\rho_1$, $\rho_2$ are as described in Expression 6, Q is a flow rate of a fluid, N is the number N of classification chambers, n is a rotation speed of the rotor 23, $\eta$ is viscosity of the fluid, $\rho_1$ is specific gravity of the fluid, t is a thickness of the blade 21, $\rho_2$ is specific gravity of a particle contained in the fluid.

An arc area $A(d)$ of the classification chamber 22 expressed as a function of the diameter d is expressed by:

$$A(d) = E(d) \cdot T(d) = \frac{(\pi d - tN)T(d)}{N} \quad \text{Expression 8}$$

where $E(d)$ is a gap between the blades and $T(d)$ is the height of the blade 21 in the diameter d position, and thus obtained from Expressions 7 and 8 above by Expression 9 below:

$$A(d) = \frac{Q}{N} \cdot \frac{1}{D_1^2} \cdot \frac{2 \times 894}{d \cdot n^2} \cdot \frac{18\eta}{9.8(\rho_2 - \rho_1)} \quad \text{Expression 9}$$

For the arc area $A(d)$ in the diameter d position to provide the constant classified particle size $D_1$, with the flow rate Q, the number N of the classification chambers 22, the rotation speed n of the rotor, the viscosity $\eta$ of the fluid, the specific gravity $\rho_1$ of the fluid, and the specific gravity $\rho_2$ of the particle being set values and constant, the arc area $A(d)$ in Expression 9 above is expressed by $A(d)=C/d$, and is a function of the diameter d and inversely proportional to the diameter d.

The character C refers to a constant expressed by Expression 10 below.

$$C = \frac{Q}{N} \cdot \frac{1}{D_1^2} \cdot \frac{2 \times 894}{n^2} \cdot \frac{18\eta}{9.8(\rho_2 - \rho_1)} \quad \text{Expression 10}$$

From Expressions 8 and 9, the height $T(d)$ of the classification blade 21 as a function of the diameter d is obtained by Expression 11 below:

$$T(d) = \frac{Q}{\pi d - tN} \cdot \frac{1}{D_1^2} \cdot \frac{2 \times 894}{d \cdot n^2} \cdot \frac{18\eta}{9.8(\rho_2 - \rho_1)} \quad \text{Expression 11}$$

The blade height T(d) to provide the constant classified particle size $D_1$ in the entire region from the outer periphery to the inner periphery of the classification chamber 22 is obtained by Expression 11. The height T(d) of the blade 21 is a function of the diameter d from Expression 11, and decreases with increasing diameter d toward the outer periphery while increases with decreasing diameter d. Thus, as shown in FIG. 4, the rotor 23 has a sectional shape with an expanded inner peripheral side. A gap E(d) between the blades is expressed by $E(d)=(\pi d-tN)/N$ from Expression 8, and increases toward the outer periphery in proportion to the diameter d (FIG. 5).

The rotor 23 of this embodiment with the blade height T increasing toward the inner peripheral side as described above was used, and with a flow rate Q, a blade thickness t, the number N of classification chambers, a rotation speed n of the rotor, viscosity $\pi$, specific gravity $\rho_1$ of the fluid, and specific gravity $\rho_2$ of the particle in Table 4 below being set as in Table 1 and the classified particle size $D_1$ being a set value in Table 4 below, a simulation calculation was performed using Expressions 3, 8, 9, and 11 above to obtain a linear speed s, an arc area A(d), a gap E(d) between the blades, and a blade height T(d) in the diameter d position. Calculation results are shown in Table 5 below. In Table 4, the classified particle size $D_1$ is set to 0.92 μm to match a classified particle size $D_1$ on an outer periphery of the rotor in a diameter position of 0.40 m as a minimum value, among classified particle sizes $D_1$ in Table 2 obtained by a simulation calculation by substituting appropriate items in Table 1 into Expression 6.

Figure 6:
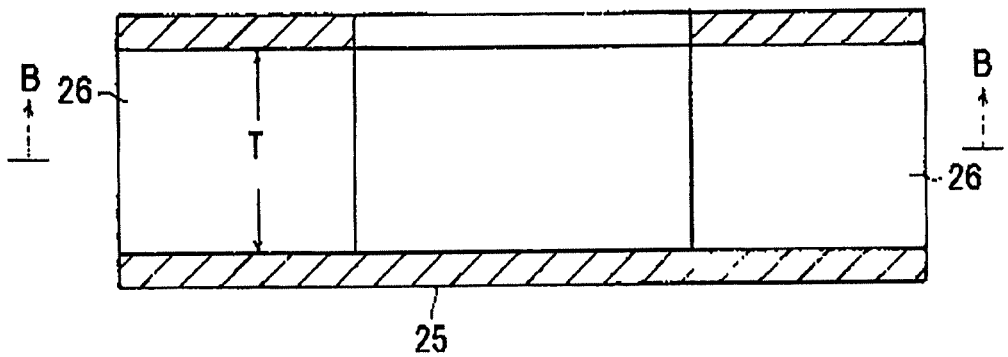
FIG. 6 is a vertical sectional view of a rotor according to another embodiment.
Figure 7:
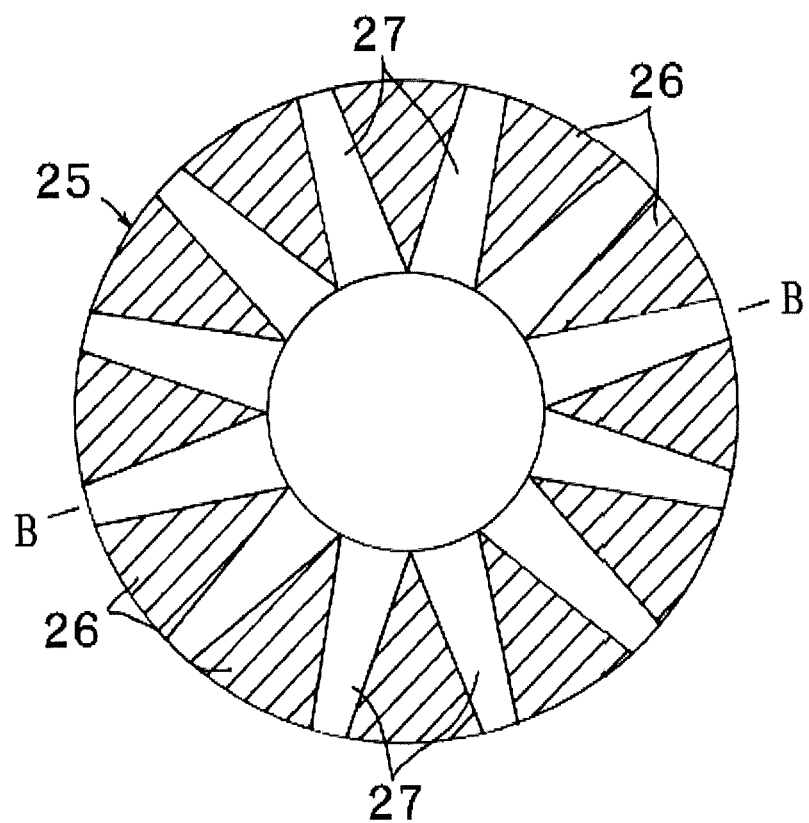
FIG. 7 is a sectional view taken along the line B-B in the rotor in FIG. 6.

FIGS. 6 and 7 show a rotor of a classifying apparatus used in the second mode. FIG. 6 is a vertical sectional view of a rotor 25 and FIG. 7 is a sectional view taken along the line B-B in FIG. 6. As shown in FIG. 6, the rotor 25 is configured so that a blade 26 has a constant height T in a radial direction and a circumferential thickness t(d) of the blade increasing from an inner periphery toward an outer periphery as shown in FIG. 7, and a classification chamber 27 has a width increasing toward an inner periphery and changing in the radial direction. The thickness t(d) of the blade 26 at the inner periphery may not be zero but is preferably zero. This is because the zero thickness of the blade 26 at the inner periphery can reduce a diameter of the inner periphery of the blade 26 and an increased diametrical length of the blade allows sufficient classification in the classification chamber.

In the embodiment for implementing the second mode, an arc area A(d) in a diameter d position is expressed by: Expression 12

$$A(d)=E(d) \cdot T$$

where E(d) is a circumferential gap between the blades. From Expressions 9 and 12 above as relational expressions of the diameter d and the arc area A(d) to provide a constant classified particle size $D_1$, the gap E(d) between the blades in the diameter d position is expressed by Expression 13 below:

$$E(d) = \frac{Q}{T \cdot N} \cdot \frac{1}{D_1^2} \cdot \frac{2 \times 894}{d \cdot n^2} \cdot \frac{18\eta}{9.8(\rho_2 - \rho_1)} \qquad \text{Expression 13}$$

TABLE 4

| | | | | | | SET VALUE | | |
|---|---|---|---|---|---|---|---|---|
| DIAMETER POSITION d m | FLOW RATE Q Nm³/s | BLADE THICKNESS t m | NUMBER OF CLASSIFICATION CHAMBERS N — | ROTATION SPEED OF ROTOR n rpm | VISCOSITY η kg/m · s | SPECIFIC GRAVITY OF PARTICLE $\rho_2$ kg/m³ | SPECIFIC GRAVITY OF FLUID $\rho_1$ kg/m³ | CLASSIFIED PARTICLE SIZE $D_1$ μm |
| 0.40 | 0.00001 | 0.005 | 12 | 2500 | 0.001 | 2300 | 1000 | 0.92 |
| 0.35 | 0.00001 | 0.005 | 12 | 2500 | 0.001 | 2300 | 1000 | 0.92 |
| 0.30 | 0.00001 | 0.005 | 12 | 2500 | 0.001 | 2300 | 1000 | 0.92 |
| 0.25 | 0.00001 | 0.005 | 12 | 2500 | 0.001 | 2300 | 1000 | 0.92 |
| 0.20 | 0.00001 | 0.005 | 12 | 2500 | 0.001 | 2300 | 1000 | 0.92 |

TABLE 5

| | | CALCULATED VALUE | | | |
|---|---|---|---|---|---|
| DIAMETER POSITION d m | CENTRIFUGAL EFFECT G | ARC AREA A(d) m² | GAP BETWEEN BLADES E(d) m | BLADE HEIGHT T(d) m | LINEAR SPEED s m/s |
| 0.40 | 1398 | 0.00100 | 0.100 | 0.0100 | 0.00084 |
| 0.35 | 1223 | 0.00114 | 0.096 | 0.0118 | 0.00073 |
| 0.30 | 1049 | 0.00133 | 0.073 | 0.0182 | 0.00063 |
| 0.25 | 874 | 0.00159 | 0.061 | 0.0261 | 0.00052 |
| 0.20 | 699 | 0.00199 | 0.047 | 0.0424 | 0.00042 |

By Expression 11 of the embodiment, the height T(d) of the blade 21 is obtained to provide a constant classified particle size $D_1$ in a radial direction in the classification chamber.

The arc area A(d) and the gap E(d) between the blades in the diameter d position obtained by a simulation calculation from Expressions 12 and 13 above, with the same set values as in Table 4 other than the blade height T being constant at 0.0381 m as shown in Table 6 below and a circumferential thickness t(d) of the blade 26 obtained by Expression 15 below, are shown in Table 6 below together with the circumferential thickness t(d) of the blade, a centrifugal effect G, and a linear speed s.

The blade height T is set to 0.0381 m to satisfy a classified particle size $D_1$=0.92 μm like the flow rate Q in Table 4. With a blade thickness t(d)=0 at a diameter d=0.20 m and the number N of classification chambers=12, E(d)=0.052 m from E(d)=πd/N. The value of E(d) and appropriate items in Table 4 are substituted into Expression 13 to obtain the blade height T of 0.0381 m at the diameter d=0.20 m. The blade thickness t(d) in the diameter d position is obtained by Expression 14 below:

$$t(d) = \frac{\pi d}{N} - E(d) \quad \text{Expression 14}$$

Expression 13 is substituted into E(d) in Expression 14, and then the thickness t(d) of the blade 26 is expressed by Expression 15 below. A simulation calculation is performed by substituting appropriate items in Table 4 into Expression 15 to obtain a blade thickness t(d) with a constant classified particle size $D_1$ of 0.92 μm from an outer periphery to an inner periphery of the classification chamber.

$$t(d) = \frac{1}{N}\left[\pi d - \frac{Q}{T} \times \frac{1}{D_1^2} \times \frac{2 \times 894}{d \cdot n^2} \times \frac{18\eta}{9.8(\rho_2 - \rho_1)}\right] \quad \text{Expression 15}$$

peripheral side, and a classification chamber has a width increasing toward the inner peripheral side.

In this embodiment, an arc area A(d) in a diameter d position is expressed by:

$$A(d) = E(d) \cdot T(d) = \frac{(\pi d - t(d)N)T(d)}{N} \quad \text{Expression 16}$$

where E(d) is a circumferential gap between the blades, and T(d) is a height of the blade. A thickness t(d) of the blade 26 expressed as a function of a diameter d is obtained by Expression 17 below:

$$t(d) = \frac{1}{N}\left[\pi d - \frac{Q}{T(d)} \times \frac{1}{D_1^2} \times \frac{2 \times 894}{d \cdot n^2} \times \frac{18\eta}{9.8(\rho_2 - \rho_1)}\right] \quad \text{Expression 17}$$

where T in Expression 15 is replaced by T(d). By substituting Expression 17 into Expression 16, the height T(d) is expressed by:

$$T(d) = \frac{Q}{E(d) \cdot N} \cdot \frac{1}{D_1^2} \cdot \frac{2 \times 894}{d \cdot n^2} \cdot \frac{18\eta}{9.8(\rho_2 - \rho_1)} \quad \text{Expression 18}$$

The gap E(d) in Expression 18 is obtained by Expression 19 below:

TABLE 6

| SET VALUE | CALCULATED VALUE | | | | | |
|---|---|---|---|---|---|---|
| DIAMETER POSITION d m | CENTRIFUGAL EFFECT G — | ARC AREA A(d) m² | GAP BETWEEN BLADES E(d) m | BLADE HEIGHT T m | LINEAR SPEED s m/s | BLADE THICKNESS t(d) m |
| 0.40 | 1398 | 0.00100 | 0.026 | 0.0381 | 0.00084 | 0.0785 |
| 0.35 | 1223 | 0.00114 | 0.030 | 0.0381 | 0.00073 | 0.0617 |
| 0.30 | 1049 | 0.00133 | 0.035 | 0.0381 | 0.00063 | 0.0436 |
| 0.25 | 874 | 0.00160 | 0.042 | 0.0381 | 0.00052 | 0.0236 |
| 0.20 | 699 | 0.00199 | 0.052 | 0.0381 | 0.00042 | 0.0000 |

In the rotor 25 in FIG. 7, the classification chambers 27 are tapered toward the outer peripheral side and radially formed. However, as a rotor 31 in FIG. 8, blades 33 having a sectional area increasing toward an outer peripheral side and tapered classification chambers 32 may be eccentrically formed.

Figure 8:
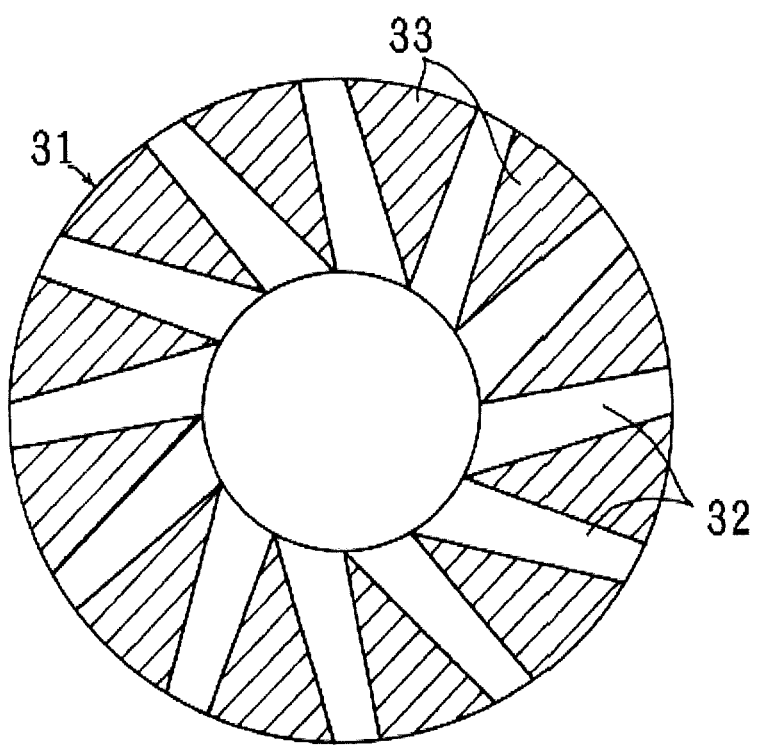
FIG. 8 is a cross sectional view of a variant of the rotor in FIG. 7.

In a further embodiment of a rotor for implementing the third mode described above, the rotor 23 in FIG. 4 and the rotors 25, 31 in FIG. 7 or 8 are combined.

Figure 15:
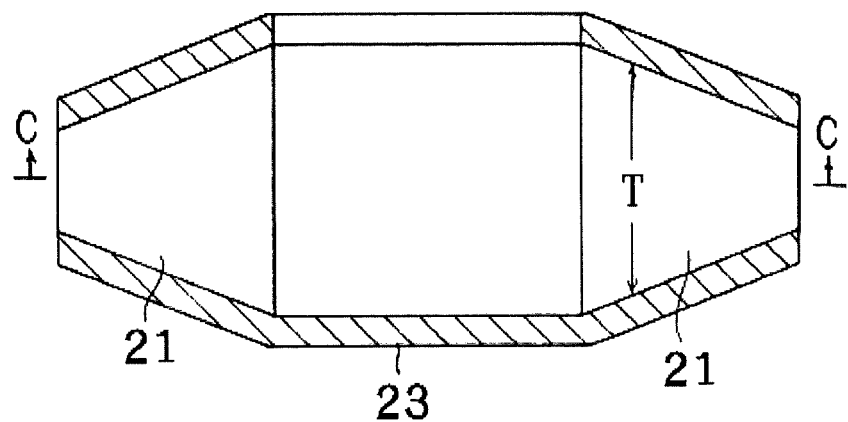
FIG. 15 is a vertical section view of a rotor according to another embodiment.
Figure 16:
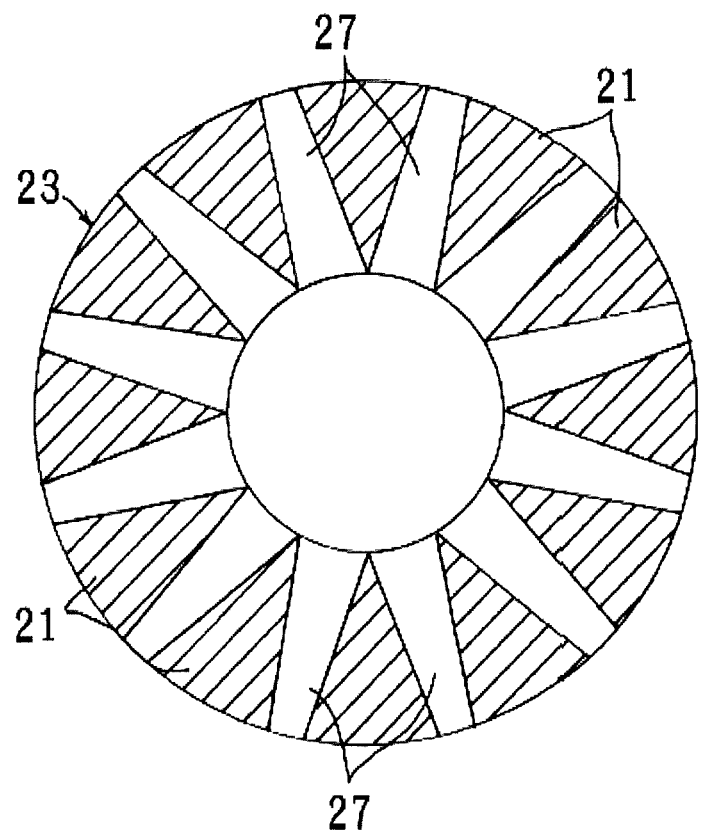
FIG. 16 is a sectional view taken along the line C-C in the rotor in FIG. 15.

FIGS. 15 and 16 are a rotor for implementing the third mode described above. More specifically, FIG. 15 is the same as FIG. 4 except that line B-B is changed to line C-C, and FIG. 16 is the same as FIG. 7 except that reference numeral 25 and 26 are changed to 23 and 21 respectively. Also, as shown in FIG. 16, the blade 21 has a height T increasing toward an inner peripheral side, and a classification chamber 26 has a width increasing toward the inner peripheral side.

Specifically, a blade has a height gradually increasing toward an inner periphery as shown in FIG. 4 to expand an inner peripheral side of the rotor. Also, as shown in FIG. 7 or 8, the blade has a thickness increasing toward an outer $$E(d) = \frac{\pi}{N} \cdot \left\{b \cdot d_2 - \frac{b \cdot d_2 - a \cdot d_1}{d_2 - d_1} \times (d_2 - d)\right\} \quad \text{Expression 19}$$

In Expression 19, $d_1$ is an inner peripheral diameter of the classification chamber, $d_2$ is an outer peripheral diameter, a is a coefficient for gap between the blades at the inner periphery, defined by $(\pi d_1 - N t_1)/\pi d_1$, b is a coefficient for gap between the blades at the outer periphery, defined by $(\pi d_2 - N t_2)/\pi d_2$, $t_1$ is a thickness of the blade 26 at an inner peripheral end, $t_2$ is a thickness thereof at an outer peripheral end. Thus, a difference between a circumferential gap on the inner peripheral diameter $d_1$ and a circumferential gap on the outer peripheral diameter $d_2$ is expressed by $\pi(bd_2 - ad_1)/N$. Any diameter d between the diameter $d_2$ and the diameter $d_1$ is obtained by Expression 20 below by proportionally dividing the difference by $(d_2 - d)/(d_2 - d_1)$, and Expression 19 above is obtained by Expression 20.

$$\frac{\pi(bd_2 - ad_1)}{N} \cdot \frac{d_2 - d}{d_2 - d_1} \qquad \text{Expression 20}$$

The thickness t(d) of the blade 26 is $t(d) = \{\pi d - N \cdot E(d)\}/N$, and thus obtained by Expression 21 below by substituting the gap E(d) obtained by Expression 19 into Expression 18.

$$t(d) = \frac{\pi d}{N} - \frac{\pi}{N} \cdot \left\{ b \cdot d_2 - \frac{b \cdot d_2 - a \cdot d_1}{d_2 - d_1} \times (d_2 - d) \right\} \qquad \text{Expression 21}$$

With the same set values as in Table 4 above except the blade thickness and a being set to 1 and b being set to 0.8, a simulation calculation was performed for the blade height T(d) by Expression 18 and the blade thickness t(d) by Expression 21 using the gap E(d) between the blades in the diameter d position obtained by Expression 19, and calculated values are shown together with an arc area A(d) and a centrifugal effect G in Table 7 below.

TABLE 7

| | CALCULATED VALUE | | | | | |
|---|---|---|---|---|---|---|
| DIAMETER POSITION d m | CENTRIFUGAL EFFECT G — | ARC AREA A(d) m² | GAP BETWEEN BLADES E(d) m | BLADE HEIGHT T(d) m | LINEAR SPEED s m/s | BLADE THICKNESS t(d) m |
| 0.40 | 1398 | 0.00100 | 0.084 | 0.0119 | 0.00084 | 0.0209 |
| 0.35 | 1223 | 0.00114 | 0.076 | 0.0150 | 0.00073 | 0.0157 |
| 0.30 | 1049 | 0.00133 | 0.068 | 0.0195 | 0.00063 | 0.0105 |
| 0.25 | 874 | 0.00159 | 0.060 | 0.0265 | 0.00052 | 0.0052 |
| 0.20 | 699 | 0.00199 | 0.052 | 0.0381 | 0.00042 | 0.0000 |

As described in the embodiments for implementing the first to third modes, the rotor is required including a blade of such a shape as to provide a constant classified particle size in the radial direction of the classification chamber.

The shown rotors 23, 25, 31 in the embodiments are used in a vertically oriented classifying apparatus, but may be similarly used in a laterally oriented classifying apparatus.

Example 1

Figure 2:
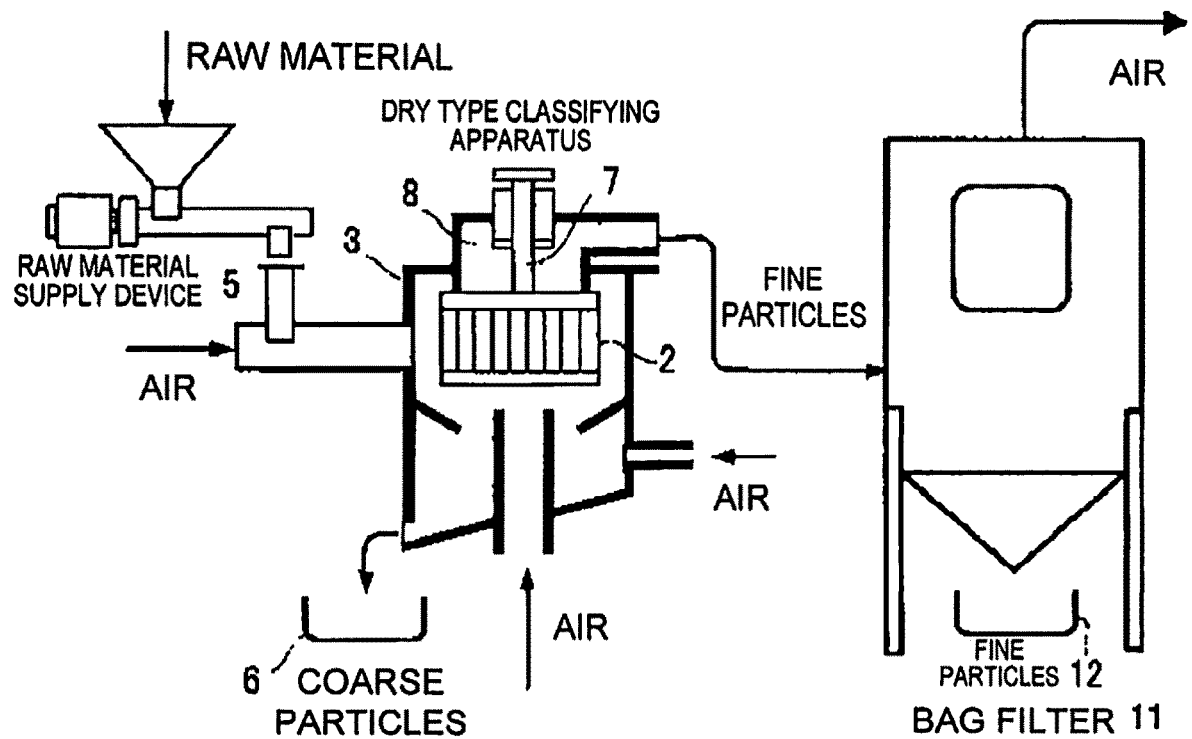
FIG. 2 is a schematic view of a configuration of a general system including a dry type classifying apparatus.
Figure 9:
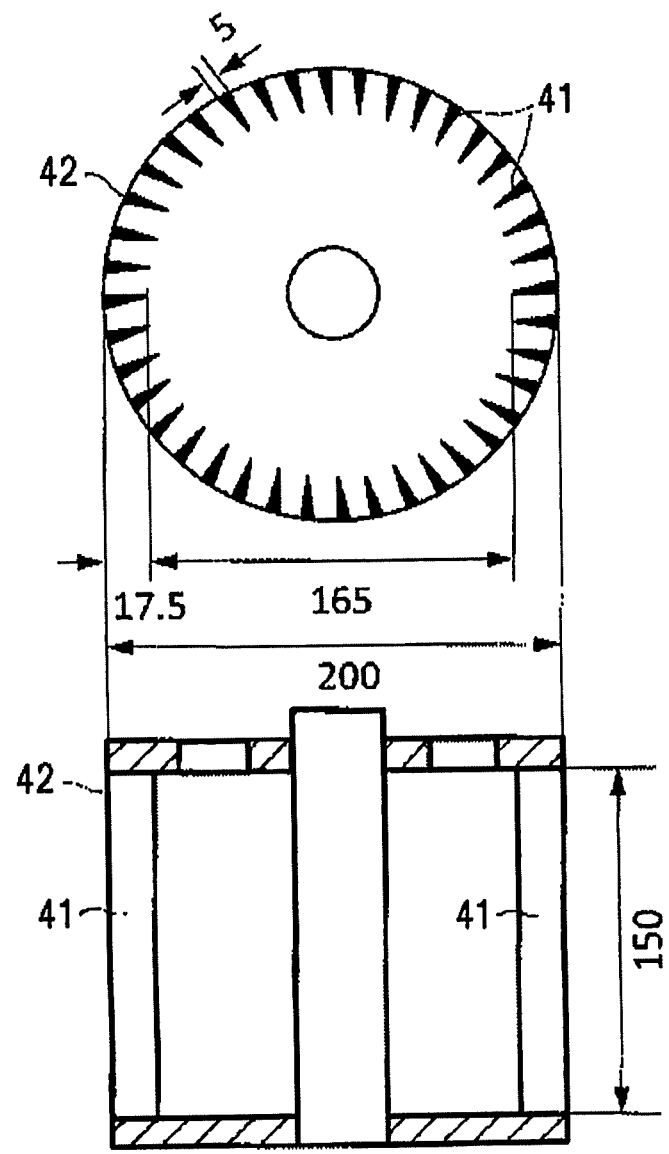
FIG. 9 shows a rotor used in a classifying apparatus in Example 1 and a size thereof.

As a rotor in a dry type classifying apparatus 3 in FIG. 2, a rotor 42 of a size in FIG. 9 was produced in which forty blades 41 were radially arranged from a center of the rotor at circumferentially regular intervals. Each blade 41 had a thickness of 5 mm at an outer peripheral diameter of 200 mm and a zero thickness at an inner peripheral diameter of 165 mm, and the thicknesses satisfy Expression 15. A raw material of 73.5 kg/h, which had a mean particle size D50 of 2.50 μm and a maximum particle size D100 of 13.20 μm, had a particle size distribution in Table 8 and FIG. 11, and were composed of heavy calcium carbonate with physical properties shown in Table 9 below, was supplied together with air of 550 Nm³/h(0.153 Nm³/s) to the classifying apparatus 3, and were classified under a set condition based on set values in Table 10 and calculated values in Table 11. Then, fine particles collected in a container 12 were sampled to measure a particle size and a rate of the fine particles. Results are shown in Table 8 below and FIG. 11. The fine particles measured had a mean particle size D50 of 1.24 μm and a maximum particle size D100 of 5.86 μm. The measurement was performed using a laser diffraction/scattering type particle size distribution measuring apparatus (trade name: LA-700) manufactured by HORIBA, Ltd.

TABLE 8

| PARTICLE SIZE (μm) | PERCENTAGE OF PARTICLES IN RAW MATERIAL % | COMPARATIVE EXAMPLE 1 PERCENTAGE OF FINE PARTICLES % | EXAMPLE 1 PERCENTAGE OF FINE PARTICLES % |
|---|---|---|---|
| 0.296 | | | |
| 0.339 | | | 0.00 |
| 0.389 | | 0.00 | 0.11 |
| 0.445 | 0.00 | 0.17 | 0.57 |
| 0.51 | 0.11 | 0.27 | 1.15 |
| 0.584 | 0.21 | 0.48 | 1.95 |
| 0.669 | 0.40 | 0.87 | 3.21 |
| 0.766 | 0.79 | 1.60 | 5.06 |
| 0.877 | 1.49 | 2.86 | 8.41 |

TABLE 8-continued

| PARTICLE SIZE (μm) | PERCENTAGE OF PARTICLES IN RAW MATERIAL % | COMPARATIVE EXAMPLE 1 PERCENTAGE OF FINE PARTICLES % | EXAMPLE 1 PERCENTAGE OF FINE PARTICLES % |
|---|---|---|---|
| 1.005 | 2.62 | 4.75 | 10.73 |
| 1.151 | 4.14 | 7.05 | 12.28 |
| 1.318 | 5.77 | 9.15 | 12.46 |
| 1.51 | 7.06 | 10.34 | 11.25 |
| 1.729 | 7.69 | 10.35 | 9.22 |
| 1.981 | 7.69 | 9.48 | 7.06 |
| 2.269 | 7.32 | 8.27 | 5.25 |
| 2.599 | 6.90 | 7.13 | 3.92 |
| 2.976 | 6.59 | 6.10 | 2.76 |
| 3.409 | 6.45 | 5.29 | 1.95 |
| 3.905 | 6.42 | 4.48 | 1.30 |
| 4.472 | 6.36 | 3.76 | 0.80 |
| 5.122 | 6.07 | 2.95 | 0.40 |
| 5.867 | 5.39 | 2.14 | 0.11 |
| 6.72 | 4.30 | 1.42 | 0.00 |
| 7.697 | 2.98 | 0.81 | |
| 8.816 | 1.77 | 0.29 | |
| 10.097 | 0.90 | 0.00 | |
| 11.565 | 0.43 | | |
| 13.246 | 0.17 | | |
| 15.172 | 0 | | |
| 17.377 | | | |

TABLE 9

| SPECIFIC SURFACE AREA | MEAN PARTICLE SIZE | | RESIDUE FROM 45 μm SCREEN | APPARENT DENSITY | DOP ABSORPTION | WHITENESS | MOISTURE |
|---|---|---|---|---|---|---|---|
| cm²/g | Aμm | Bμm | % | g/ml | ml/100 g | % | % |
| AIR PERMEATION METHOD | AIR PERMEATION METHOD | DIAMETER AT 50% IN WEIGHT CUMULATIVE PARTICLE SIZE DISTRIBUTION | JIS STANDARD SCREEN | JIS K5101 STATIC METHOD | BASED ON JIS K5101 (USE DOP) | SPECTROSCOPIC COLORIMETER/ WHITENESS METER | JIS K0068 |
| 21,000 | 1.1 | 2.5 | 0 | 0.3 | 33 | 43 | 94 |

TABLE 10

| SET VALUE | | | | | | | |
|---|---|---|---|---|---|---|---|
| DIAMETER POSITION d m | FLOW RATE OF FLUID Q m³/s | NUMBER OF CLASSIFICATION CHAMBERS N — | ROTATION SPEED OF ROTOR n rpm | VISCOSITY η kg/m·s | SPECIFIC GRAVITY OF PARTICLE ρ₂ kg/m³ | SPECIFIC GRAVITY OF LIQUID ρ₁ kg/m³ | BLADE HEIGHT T m |
| 0.2000 | 0.153 | 40 | 7000 | 0.000018 | 2700 | 1.2 | 0.15 |
| 0.1942 | 0.153 | 40 | 7000 | 0.000018 | 2700 | 1.2 | 0.15 |
| 0.1883 | 0.153 | 40 | 7000 | 0.000018 | 2700 | 1.2 | 0.15 |
| 0.1825 | 0.153 | 40 | 7000 | 0.000018 | 2700 | 1.2 | 0.15 |
| 0.1767 | 0.153 | 40 | 7000 | 0.000018 | 2700 | 1.2 | 0.15 |
| 0.1708 | 0.153 | 40 | 7000 | 0.000018 | 2700 | 1.2 | 0.15 |
| 0.1650 | 0.153 | 40 | 7000 | 0.000018 | 2700 | 1.2 | 0.15 |

TABLE 11

| CALCULATED VALUE | | | | | | |
|---|---|---|---|---|---|---|
| DIAMETER POSITION d m | CENTRIFUGAL EFFECT G — | BLADE THICKNESS t(d) M | ARC AREA A(d) m² | GAP BETWEEN BLADES E(d) m | LINEAR SPEED s m/sec | CLASSIFIED PARTICLE SIZE $D_1$ μm |
| 0.2000 | 5481 | 0.0050 | 0.00161 | 0.0107 | 2.38 | 2.31 |
| 0.1942 | 5321 | 0.0042 | 0.00166 | 0.0111 | 2.30 | 2.31 |
| 0.1883 | 5161 | 0.0033 | 0.00172 | 0.0115 | 2.23 | 2.31 |
| 0.1825 | 5001 | 0.0025 | 0.00177 | 0.0118 | 2.16 | 2.31 |
| 0.1767 | 4842 | 0.0017 | 0.00183 | 0.0122 | 2.09 | 2.31 |
| 0.1708 | 4682 | 0.0008 | 0.00189 | 0.0126 | 2.03 | 2.31 |
| 0.1650 | 4522 | 0 | 0.00194 | 0.0130 | 1.97 | 2.31 |

The classified particle size $D_1$ of 2.31 μm in Table 11 was a classified particle size on an outer periphery of the classification chamber obtained with a thickness t(d) of the blade 41 at the outer periphery of the classification chamber being set to 5 mm, and obtained by a simulation calculation by substituting appropriate items in Table 10 into Expression 6. The blade thickness t(d) in each diameter position in Table 11 was obtained by substituting the classified particle size $D_1$ set to be constant in a radial direction of the classification chamber and appropriate items in Table 10 into Expression 15, and an inner peripheral diameter d at t=0 was obtained by Expression 15. A centrifugal effect G was obtained by substituting the rotation speed n of the rotor in Table 10 into G=(d·n²)/(2×894), an arc area A was obtained by substituting the blade thickness t(d) obtained by the above and the appropriate items in Table 10 into Expression 5 with t being replaced by t(d), a linear speed s was obtained by substituting the arc area A obtained by the above and the appropriate items in Table 10 into Expression 3, and a gap E(d) between the blades was obtained from the thickness t(d) and by Expression 14. As shown in Table 8, a maximum particle size 100 in Example 1 at this time was 5.867 μm.

Comparative Example 1

Figure 10:
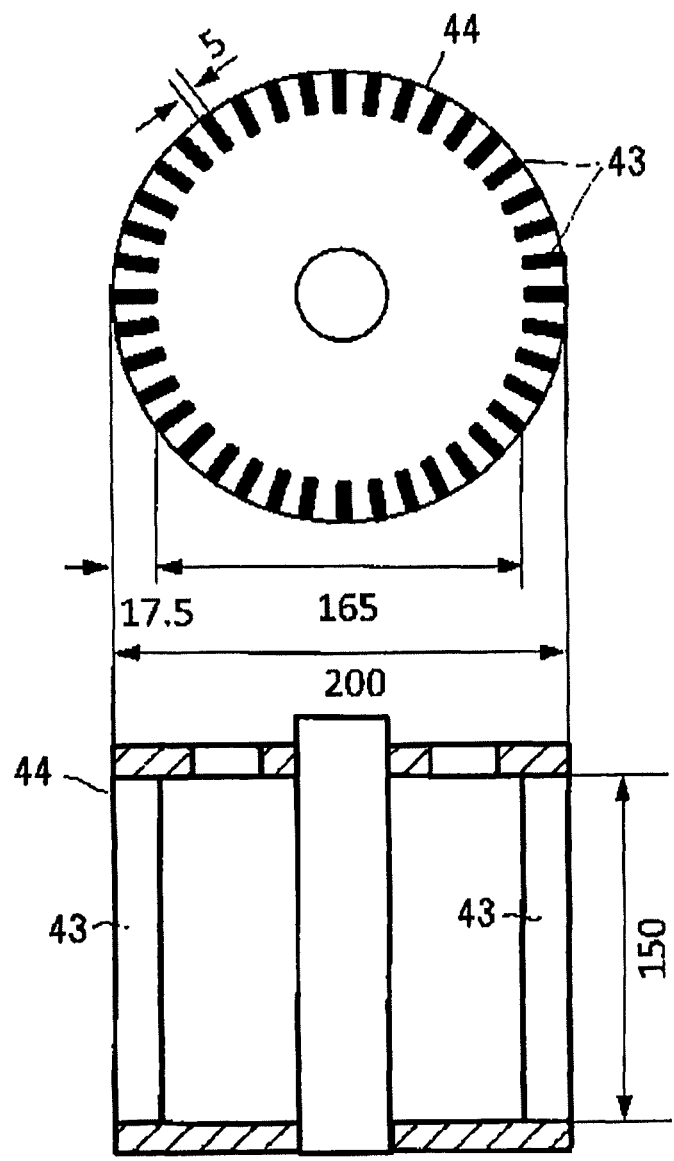
FIG. 10 shows a rotor used in a classifying apparatus in Comparative example 1 and a size thereof.

A classifying apparatus was used including a rotor 44 that has the same structure and size as the rotor 42 in FIG. 9 except a constant thickness of 5 mm of a blade 43 as shown in FIG. 10 and the same structure as the classifying apparatus in Example 1 other than the rotor, and the same raw material as in Example 1 was used to perform classification under the same condition. Tables 12 and 13 below show items used for a simulation calculation and calculation results. A classified particle size $D_1$ in Table 13 was obtained by substituting appropriate items in Table 12 into Expression 6, an arc area A(d) was obtained by substituting the appropriate items in Table 12 into Expression 5, a centrifugal effect G was obtained by substituting a rotation speed n of the rotor in Table 12 into G=(d·n²)/(2×894), a linear speed s was obtained by substituting the arc area A(d) obtained and the appropriate items in Table 12 into Expression 3, and a gap E(d) between the blades was obtained by substituting the arc area A(d) and a blade height T in Table 12 into E(d)=A(d)/T.

Figure 11:
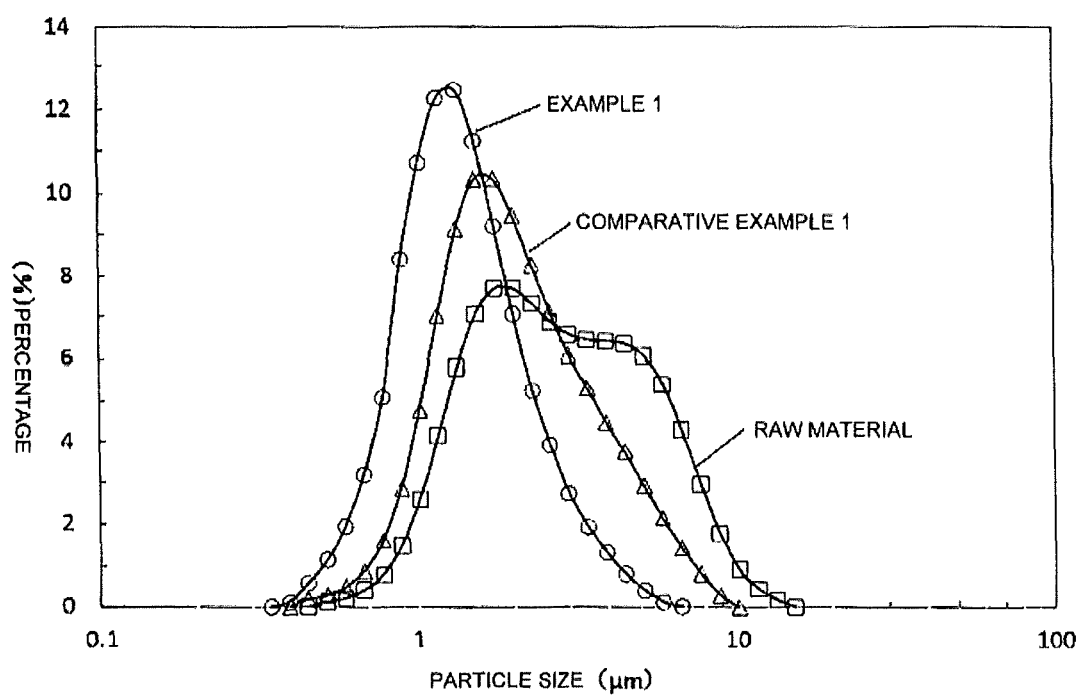
FIG. 11 shows a particle size distribution of a raw material and particle size distributions of particles classified using the classifying apparatuses in FIGS. 9 and 10.

Results are shown in Table 8 and FIG. 11 together with Example 1. In Comparative example 1, the same measuring apparatus as in Example 1 was used to measure a particle size by the same method as in Example 1. Then, the fine particles collected in the container 12 in FIG. 2 had a mean particle size D50 of 1.79 μm and a maximum particle size D100 of 8.81 μm.

thirty blades 46 were radially arranged from a center of the rotor at circumferentially regular intervals. Each blade 46 had a thickness of 3 mm at an outer peripheral diameter of 86 mm and a zero thickness at an inner peripheral diameter of 70.2 mm, and the thicknesses satisfy Expression 15. A raw material, which had a mean particle size D50 of 5 μm and a particle size D98 of 14 μm, had a particle size distribution in Table 14 below and FIG. 14, and were composed of spherical molten silica (trade name: FB-5SDC) manufactured by Denka Company Limited, was mixed into a 0.2 wt % hexametaphosphoric acid aqueous solution, and

TABLE 12

SET VALUE

| DIAMETER POSITION d m | FLOW RATE OF FLUID Q m³/s | BLADE HEIGHT T m | NUMBER OF CLASSIFICATION CHAMBERS N — | ROTATION SPEED OF ROTOR n rpm | VISCOSITY η kg/m·s | SPECIFIC GRAVITY OF PARTICLE $\rho_2$ kg/m³ | SPECIFIC GRAVITY OF LIQUID $\rho_1$ kg/m³ | BLADE THICKNESS t m |
|---|---|---|---|---|---|---|---|---|
| 0.2000 | 0.153 | 0.15 | 40 | 7000 | 1.8E−05 | 2700 | 1.2 | 0.005 |
| 0.1942 | 0.153 | 0.15 | 40 | 7000 | 1.8E−05 | 2700 | 1.2 | 0.005 |
| 0.1883 | 0.153 | 0.15 | 40 | 7000 | 1.8E−05 | 2700 | 1.2 | 0.005 |
| 0.1825 | 0.153 | 0.15 | 40 | 7000 | 1.8E−05 | 2700 | 1.2 | 0.005 |
| 0.1767 | 0.153 | 0.15 | 40 | 7000 | 1.8E−05 | 2700 | 1.2 | 0.005 |
| 0.1708 | 0.153 | 0.15 | 40 | 7000 | 1.8E−05 | 2700 | 1.2 | 0.005 |
| 0.1650 | 0.153 | 0.15 | 40 | 7000 | 1.8E−05 | 2700 | 1.2 | 0.005 |

TABLE 13

CALCULATED VALUE

| DIAMETER POSITION d m | CENTRIFUGAL EFFECT G — | ARC AREA A(d) m² | GAP BETWEEN BLADES E(d) m | LINEAR SPEED s m/sec | CLASSIFIED PARTICLE SIZE $D_1$ μm |
|---|---|---|---|---|---|
| 0.2000 | 5481 | 0.00161 | 0.0107 | 2.38 | 2.31 |
| 0.1942 | 5321 | 0.00154 | 0.0102 | 2.49 | 2.39 |
| 0.1883 | 5161 | 0.00147 | 0.0098 | 2.61 | 2.49 |
| 0.1825 | 5001 | 0.00140 | 0.0093 | 2.73 | 2.59 |
| 0.1767 | 4842 | 0.00133 | 0.0089 | 2.88 | 2.70 |
| 0.1708 | 4682 | 0.00126 | 0.0084 | 3.03 | 2.82 |
| 0.1650 | 4522 | 0.00119 | 0.0080 | 3.21 | 2.95 |

A dry type classifying apparatus including the rotor in FIG. 9 produced with the constant classified particle size in the classification chamber and the blade thickness satisfying Expression 15, and a classifying apparatus including the rotor with the constant blade thickness were used and compared as described above. Then, as shown in FIG. 11, a particle size distribution in Example 1 was shifted to the left as compared to a particle size distribution in comparative example 1, and finer particles and a sharper distribution were obtained, reducing entering of coarse particles.

Example 2

Figure 3:
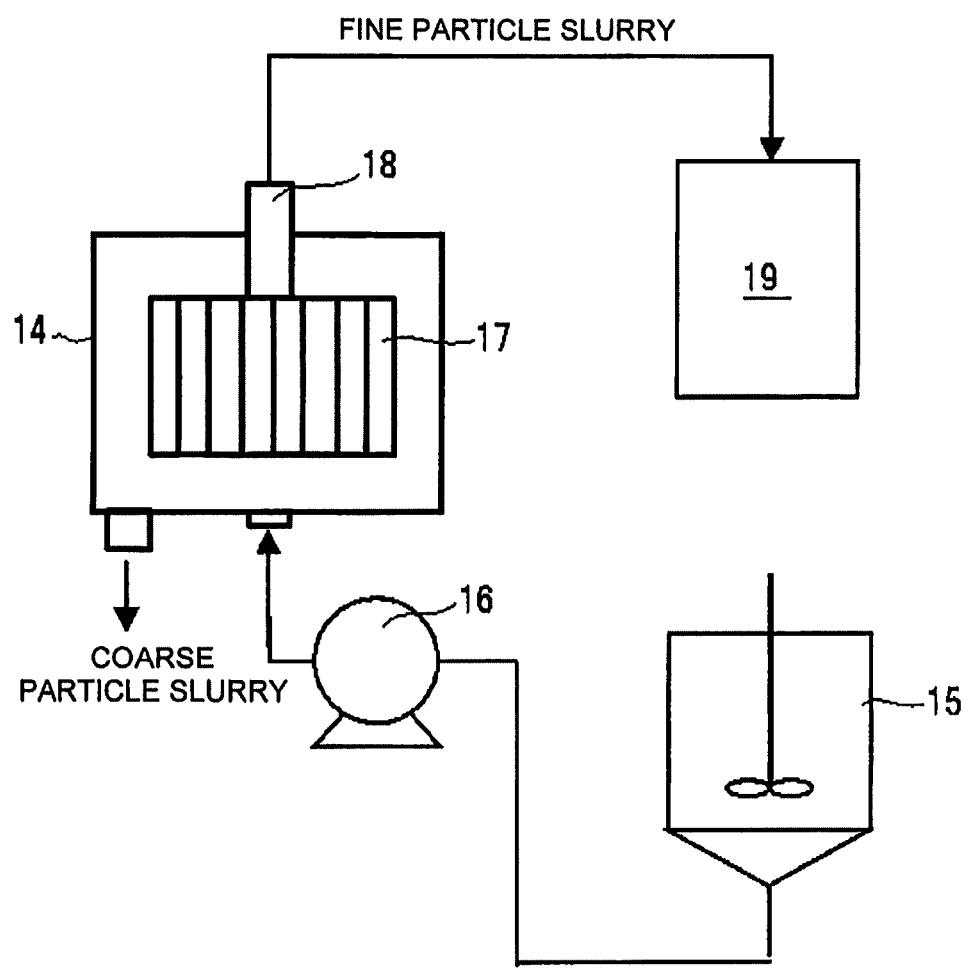
FIG. 3 is a schematic view of a configuration of a general system including a wet type classifying apparatus.
Figure 12:
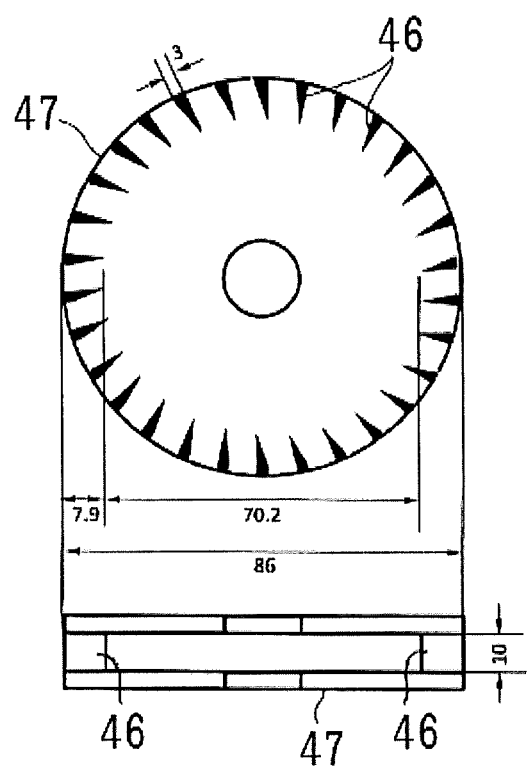
FIG. 12 shows a rotor used in a classifying apparatus in Example 2 and a size thereof.

As a rotor 17 of a wet type classifying apparatus 14 in FIG. 3, a rotor 47 of a size in FIG. 12 was produced in which such a raw material slurry was used to perform an experiment three times under a set condition with set values in Table 15 and calculated values in Table 16 obtained by a simulation calculation from the set values. Results are shown in Table 14 below and FIG. 14. A fine particle slurry collected in a tank 19 was sampled to measure a particle size for each experiment. The mean particle sizes D50 were 2.7, 2.9, and 2.9 μm, and the particle sizes D98 were 5.7, 6.6, and 6.8 μm. The measurement was performed using a laser diffraction type particle size distribution measuring apparatus (trade name: SALD-3100) manufactured by Shimadzu Corporation.

TABLE 14

| PARTICLE SIZE (μm) | PERCENTAGE OF PARTICLES IN RAW MATERIAL % | COMPARATIVE EXAMPLE 2 PERCENTAGE OF FINE PARTICLES % | | EXAMPLE 2 PERCENTAGE OF FINE PARTICLES % | | |
|---|---|---|---|---|---|---|
| | | -est1 | -est2 | -est1 | -est2 | -est3 |
| 0.233 | 0 | 0 | 0 | 0 | 0 | 0 |
| 0.291 | 0 | 0 | 0 | 0 | 0 | 0 |
| 0.362 | 0 | 0 | 0.363 | 0.002 | 0.003 | 0 |
| 0.451 | 0.018 | 0.004 | 0.059 | 0.017 | 0.029 | 0.002 |
| 0.563 | 0.134 | 0.074 | 0.121 | 0.067 | 0.134 | 0.048 |
| 0.701 | 0.524 | 0.397 | 0.456 | 0.21 | 0.411 | 0.267 |
| 0.874 | 1.349 | 1.257 | 1.21 | 0.616 | 0.976 | 0.912 |
| 1.089 | 2.51 | 2.705 | 2.456 | 1.619 | 2.01 | 22 |
| 1.356 | 3.668 | 4.397 | 4.086 | 3.275 | 3.555 | 3.976 |
| 1.690 | 4.622 | 5.993 | 5.836 | 4.682 | 5.025 | 5.531 |
| 2.106 | 5.504 | 7.345 | 7.227 | 10.357 | 7.45 | 7.142 |
| 2.625 | 6.538 | 8.513 | 10.039 | 24.636 | 20.768 | 19.047 |
| 3.271 | 7.693 | 14.273 | 16.675 | 27.179 | 25.734 | 26.218 |
| 4.076 | 8.605 | 17.045 | 18.543 | 21.959 | 22.639 | 24.201 |
| 5.079 | 9.182 | 13.076 | 12.547 | 2.448 | 5.498 | 4.425 |
| 6.329 | 13.959 | 13.503 | 11.328 | 1.892 | 3.412 | 3.461 |
| 7.887 | 16.615 | 6.109 | 5.307 | 0.824 | 1.746 | 1.841 |
| 9.828 | 10.515 | 3.567 | 2.723 | 0.205 | 0.535 | 0.614 |
| 12.247 | 5.058 | 1.382 | 0.872 | 0.012 | 0.075 | 0.107 |
| 15.262 | 2.555 | 0.33 | 0.152 | 0 | 0 | 0.008 |
| 19.018 | 0.814 | 0.031 | 0 | 0 | 0 | 0 |
| 23.699 | 0.137 | 0 | 0 | 0 | 0 | 0 |

TABLE 15

| SET VALUE | | | | | | | |
|---|---|---|---|---|---|---|---|
| DIAMETER POSITION d m | FLOW RATE OF FLUID Q N m³/s | NUMBER OF CLASSIFICATION CHAMBERS N — | ROTATION SPEED OF ROTOR n rpm | VISCOSITY η kg/m · s | SPECIFIC GRAVITY OF PARTICLE $\rho_2$ kg/m³ | SPECIFIC GRAVITY OF LIQUID $\rho_1$ kg/m³ | BLADE HEIGHT T m |
| 0.0860 | 2.78E−06 | 30 | 4442 | 0.001 | 2300 | 1000 | 0.01 |
| 0.0834 | 2.78E−06 | 30 | 4442 | 0.001 | 2300 | 1000 | 0.01 |
| 0.0807 | 2.78E−06 | 30 | 4442 | 0.001 | 2300 | 1000 | 0.01 |
| 0.0781 | 2.78E−06 | 30 | 4442 | 0.001 | 2300 | 1000 | 0.01 |
| 0.0755 | 2.78E−06 | 30 | 4442 | 0.001 | 2300 | 1000 | 0.01 |
| 0.0728 | 2.78E−06 | 30 | 4442 | 0.001 | 2300 | 1000 | 0.01 |
| 0.0702 | 2.78E−06 | 30 | 4442 | 0.001 | 2300 | 1000 | 0.01 |

TABLE 16

| CALCULATED VALUE | | | | | | |
|---|---|---|---|---|---|---|
| DIAMETER POSITION d m | CENTRIFUGAL EFFECT G — | BLADE THICKNESS t(d) M | ARC AREA A(d) m² | GAP BETWEEN BLADES E(d) m | LINEAR SPEED s m/sec | CLASSIFIED PARTICLE SIZE $D_1$ μm |
| 0.0860 | 949 | 0.00300 | 0.000060 | 0.0060 | 0.00154 | 1.52 |
| 0.0834 | 920 | 0.00250 | 0.000062 | 0.0062 | 0.00149 | 1.52 |
| 0.0807 | 891 | 0.00200 | 0.000065 | 0.0065 | 0.00144 | 1.52 |
| 0.0781 | 862 | 0.00150 | 0.000067 | 0.0067 | 0.00139 | 1.52 |
| 0.0755 | 833 | 0.00100 | 0.000069 | 0.0069 | 0.00134 | 1.52 |
| 0.0728 | 804 | 0.00050 | 0.000071 | 0.0071 | 0.00130 | 1.52 |
| 0.0702 | 775 | 0.00000 | 0.000073 | 0.0073 | 0.00126 | 1.52 |

Figure 14:
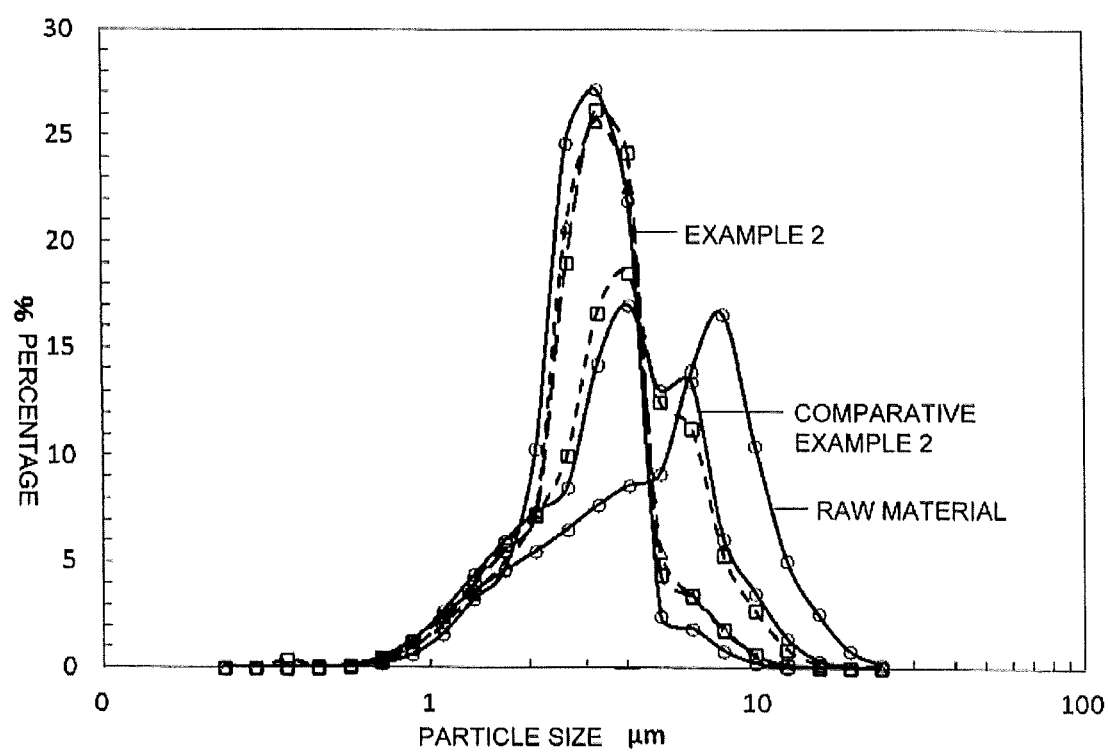
FIG. 14 shows a particle size distribution of a raw material and particle size distributions of particles classified using the classifying apparatuses in FIGS. 12 and 13.

The classified particle size $D_1$ in Table 16 was a classified particle size on an outer periphery of the classification chamber obtained with a thickness t(d) of the blade 46 at the outer periphery of the classification chamber being set to 3 mm, and obtained by a simulation calculation by substituting appropriate items in Table 15 into Expression 6. The blade thickness t(d) in each diameter position was obtained by substituting the classified particle size set to be constant at 1.52 μm in a radial direction and appropriate items in Table 15 into Expression 15, and an inner peripheral diameter d at t=0 was obtained by Expression 15. A centrifugal effect G was obtained by substituting the rotation speed n of the rotor in Table 15 into $G=(d \cdot n^2)/(2 \times 894)$, an arc area A was obtained by substituting the blade thickness t(d) obtained by the above and the appropriate items in Table 15 into Expression 5, a linear speed s was obtained by substituting the arc area A obtained by the above and the appropriate items in Table 15 into Expression 3, and a gap E(d) between the blades was obtained from the thickness t(d) and by Expression 14. As shown in Table 14, the particle sizes D98 in Example 2 at this time were 5.7, 6.6, and 6.8 μm.

apparatus as in Example 2 was used to measure a particle size twice by the same method as in Example 2. Then, the fine particles collected in the container 19 in FIG. 3 had mean particle sizes D50 of 3.3 and 3.5 μm, and particle sizes D98 of 9.1 and 9.7 μm Also in the wet type classifying apparatus, as seen in FIG. 14, a particle size distribution in Example 2 is shifted to the left in FIG. 14 as compared to a particle size distribution in

TABLE 17

SET VALUE

| DIAMETER POSITION d m | FLOW RATE OF FLUID Q Xm³/s | BLADE HEIGHT T m | NUMBER OF CLASSIFICATION CHAMBERS N — | ROTATION SPEED OF ROTOR n rpm | VISCOSITY η kg/m·s | SPECIFIC GRAVITY OF PARTICLE $\rho_2$ kg/m³ | SPECIFIC GRAVITY OF FLUID $P_1$ kg/m³ | BLADE THICKNESS t m |
|---|---|---|---|---|---|---|---|---|
| 0.0860 | 2.78E−06 | 0.01 | 30 | 4442 | 0.001 | 2300 | 1000 | 0.003 |
| 0.0834 | 2.78E−06 | 0.01 | 30 | 4442 | 0.001 | 2300 | 1000 | 0.003 |
| 0.0807 | 2.78E−06 | 0.01 | 30 | 4442 | 0.001 | 2300 | 1000 | 0.003 |
| 0.0781 | 2.78E−06 | 0.01 | 30 | 4442 | 0.001 | 2300 | 1000 | 0.003 |
| 0.0755 | 2.78E−06 | 0.01 | 30 | 4442 | 0.001 | 2300 | 1000 | 0.003 |
| 0.0728 | 2.78E−06 | 0.01 | 30 | 4442 | 0.001 | 2300 | 1000 | 0.003 |
| 0.0702 | 2.78E−06 | 0.01 | 30 | 4442 | 0.001 | 2300 | 1000 | 0.003 |

TABLE 18

CALCULATED VALUE

| DIAMETER POSITION d m | CENTRIFUGAL EFFECT G — | ARC AREA A(d) m² | GAP BETWEEN BLADES E(d) m | LINEAR SPEED s m/sec | CLASSIFIED PARTICLE SIZE $D_1$ μm |
|---|---|---|---|---|---|
| 0.0860 | 949 | 0.000060 | 0.0060 | 0.00154 | 1.52 |
| 0.0834 | 920 | 0.000057 | 0.0057 | 0.00162 | 1.58 |
| 0.0807 | 891 | 0.000055 | 0.0055 | 0.00170 | 1.64 |
| 0.0781 | 862 | 0.000052 | 0.0052 | 0.00179 | 1.71 |
| 0.0755 | 833 | 0.000049 | 0.0049 | 0.00189 | 1.79 |
| 0.0728 | 804 | 0.000046 | 0.0046 | 0.00200 | 1.88 |
| 0.0702 | 775 | 0.000043 | 0.0043 | 0.00213 | 1.97 |

Comparative Example 2

Figure 13:
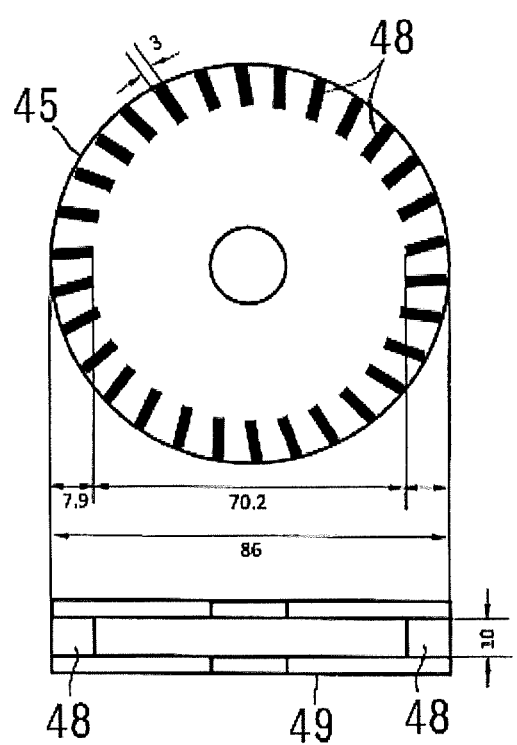
FIG. 13 shows a rotor used in a classifying apparatus in Comparative example 2 and a size thereof.

A classifying apparatus was used including a rotor 45 that has the same structure and size as the rotor 47 in FIG. 12 except a constant thickness of 3 mm of a blade 48 as shown in FIG. 13 and the same structure as the classifying apparatus in Example 2 other than the rotor, and the same raw material as in Example 2 was used to perform classification under the same condition.

Tables 17 and 18 show items used for a simulation calculation and calculation results. A classified particle size $D_1$ in Table 18 was obtained by substituting appropriate items in Table 17 into Expression 6, an arc area A(d) was obtained by substituting the appropriate items in Table 17 into Expression 5, a centrifugal effect G was obtained by substituting a rotation speed n of the rotor in Table 17 into $G=(d \cdot n^2)/(2 \times 894)$, a linear speed s was obtained by substituting the arc area A(d) obtained and the appropriate items in Table 17 into Expression 3, and a gap E(d) between the blades was obtained by substituting the arc area A(d) and a blade height T in Table 17 into E(d)=A(d)/T.

Results are shown in Table 14 and FIG. 14 together with Example 2. In Comparative example 2, the same measuring comparative example 2, and much finer particles and a much sharper distribution were obtained, reducing entering of coarse particles.

INDUSTRIAL APPLICABILITY

The classifying apparatus of the present invention can be used in general industry treating wet and dry type classification of any powder of micron to submicron size, for example, metal industry, chemical industry, pharmaceutical industry, cosmetic industry, pigment, food industry, ceramic industry, etc.

REFERENCE SIGNS LIST 1, 21, 26, 33, 41, 43, 46, 48 blade
2, 17, 23, 25, 31, 42, 44, 47 rotor
9, 22, 27, 32 classification chamber

What is claimed is:
1. A classifying apparatus comprising a rotor that includes multiple blades radially or eccentrically arranged at circumferential intervals and classification chambers between the blades, the classifying apparatus being configured to move particles having a size larger than a classified particle size toward an outer peripheral side and move particles having a size smaller than the classified particle size toward an inner peripheral side while a fluid flowing into the classification chambers flows from the outer peripheral side to the inner peripheral side, and to classify fine particles in the fluid so that the classified particle size is constant in an entire radial region from an outer periphery to an inner periphery of the classification chamber, characterized in that the blade has a constant height along a rotation axis of the rotor and a circumferential thickness increasing toward the outer periphery, and a blade thickness t(d) in a diameter d position of the classification chamber is obtained by Expression 15 below:

$$t(d) = \frac{1}{N}\left[\pi d - \frac{Q}{T} \times \frac{1}{D_1^2} \times \frac{2 \times 894}{d \cdot n^2} \times \frac{18\eta}{9.8(\rho_2 - \rho_1)}\right]$$ Expression 15 where Q is a flow rate, N is a number of classification chambers in a circumferential direction, $D_1$ is a classified particle size, n is a rotation speed of the rotor, $\eta$ is viscosity of the fluid, $\rho_1$ is specific gravity of the fluid, $\rho_2$ is specific gravity of a particle, and T is a blade height (constant).

2. The classifying apparatus according to claim 1, characterized in that a blade thickness t(d) at the inner periphery of the blade is zero.

3. A classifying apparatus comprising a rotor that includes multiple blades radially or eccentrically arranged at circumferential intervals and classification chambers between the blades, the classifying apparatus being configured to move particles having a size larger than a classified particle size toward an outer peripheral side and move particles having a size smaller than the classified particle size toward an inner peripheral side while a fluid flowing into the classification chambers flows from the outer peripheral side to the inner peripheral side, and to classify fine particles in the fluid so that the classified particle size is constant in an entire radial region from an outer periphery to an inner periphery of the classification chamber, characterized in that the blade has a constant circumferential thickness and a height along a rotation axis of the rotor increasing toward the inner periphery, and a blade height T(d) in a diameter d position of the classification chamber satisfies Expression 11 below:

$$T(d) = \frac{Q}{\pi d - tN} \cdot \frac{1}{D_1^2} \cdot \frac{2 \times 894}{d \cdot n^2} \cdot \frac{18\eta}{9.8(\rho_2 - \rho_1)}$$ Expression 11 where Q is a flow rate, N is the number of classification chambers in a circumferential direction, $D_1$ is a classified particle size, n is a rotation speed of the rotor, $\eta$ is viscosity of the fluid, $\rho_1$ is specific gravity of the fluid, $\rho_2$ is specific gravity of a particle, and t is a blade thickness.

4. A classifying apparatus comprising a rotor that includes multiple blades radially or eccentrically arranged at circumferential intervals and classification chambers between the blades, the classifying apparatus being configured to move particles having a size larger than a classified particle size toward an outer peripheral side and move particles having a size smaller than the classified particle size toward an inner peripheral side while a fluid flowing into the classification chambers flows from the outer peripheral side to the inner peripheral side, and to classify fine particles in the fluid so that the classified particle size is constant in an entire radial region from an outer periphery to an inner periphery of the classification chamber, characterized in that the blade has a height along a rotation axis of the rotor increasing toward the inner periphery and a circumferential thickness increasing toward the outer periphery, and a blade height T(d) and a blade thickness t(d) in a diameter d position of the classification chamber are obtained by Expressions 18, 19, and 21 below:

$$T(d) = \frac{Q}{E(d) \cdot N} \cdot \frac{1}{D_1^2} \cdot \frac{2 \times 894}{d \cdot n^2} \cdot \frac{18\eta}{9.8(\rho_2 - \rho_1)}$$ Expression 18

$$E(d) = \frac{\pi}{N} \cdot \left\{b \cdot d_2 - \frac{b \cdot d_2 - a \cdot d_1}{d_2 - d_1} \times (d_2 - d)\right\}$$ Expression 19

$$t(d) = \frac{\pi d}{N} - \frac{\pi}{N} \cdot \left\{b \cdot d_2 - \frac{b \cdot d_2 - a \cdot d_1}{d_2 - d_1} \times (d_2 - d)\right\}$$ Expression 21 where a is a coefficient of $(\pi d_1 - Nt_1)/\pi d_1$ of a gap between the blades at the inner periphery, b is a coefficient of $(\pi d_2 - Nt_2)/\pi d_2$ of a gap between the blades at the outer periphery, $d_1$ is an inner peripheral diameter of the rotor, $d_2$ is an outer peripheral diameter of the rotor, $t_1$ is a blade thickness at the inner periphery, $t_2$ is a blade thickness at the outer periphery, Q is a flow rate, N is the number of classification chambers in a circumferential direction, $D_1$ is a classified particle size, n is a rotation speed of the rotor, $\eta$ is viscosity of the fluid, $\rho_1$ is specific gravity of the fluid, and $\rho_2$ is specific gravity of a particle.

* * * * *